(12) United States Patent
Vempati et al.

(10) Patent No.: US 9,020,903 B1
(45) Date of Patent: Apr. 28, 2015

(54) RECOVERING DUPLICATE BLOCKS IN FILE SYSTEMS

(75) Inventors: Srinivasa Rao Vempati, Upton, MA (US); Dixitkumar Vishnubhai Patel, Monroe, NJ (US); Jean-Pierre Bono, Westborough, MA (US); Marshall Hansi Wu, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 15 days.

(21) Appl. No.: 13/538,965

(22) Filed: Jun. 29, 2012

(51) Int. Cl.
*G06F 17/00* (2006.01)
*G06F 12/12* (2006.01)

(52) U.S. Cl.
CPC .................................. *G06F 12/121* (2013.01)

(58) Field of Classification Search
USPC ................................................. 707/674, 692
See application file for complete search history.

(56) References Cited

U.S. PATENT DOCUMENTS

| | | | | |
|---|---|---|---|---|
| 7,472,242 B1 * | 12/2008 | Deshmukh et al. | ........... | 711/162 |
| 8,010,503 B1 * | 8/2011 | Chen et al. | ..................... | 707/679 |
| 8,055,864 B2 * | 11/2011 | Sawdon et al. | ................ | 711/162 |
| 2010/0131474 A1 * | 5/2010 | Zayas et al. | .................... | 707/691 |
| 2013/0117514 A1 * | 5/2013 | Gunda et al. | ................... | 711/162 |

\* cited by examiner

*Primary Examiner* — Cam-Y Truong
(74) *Attorney, Agent, or Firm* — Deepika Bhayana; Jason A. Reyes; Krishnendu Gupta

(57) ABSTRACT

A method is used in recovering duplicate blocks in file systems. A duplicate file system block is detected in a file system. The duplicate file system block is referred by a first inode associated with a first file of the file system and a second inode associated with a second file of the file system. Metadata of the duplicate file system block is evaluated. Based on the evaluation, a set of inodes in the file system is determined. Each inode of the set of inodes refer to the duplicate file system block. Based on the determination, the set of inodes is updated.

13 Claims, 12 Drawing Sheets

LOGICAL VIEW MAPPED TO FILESYSTEM BLOCKS

RECOVERING DUPLICATE BLOCKS IN FILE SYSTEMS

BACKGROUND

1. Technical Field

This application relates to recovering duplicate blocks in file systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to a disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

A file system checking (FSCK) utility provides a mechanism to help detect and fix inconsistencies in a file system. The FSCK utility verifies the integrity of the file system and optionally repairs the file system. In general, the primary function of the FSCK utility is to help maintain the integrity of the file system. The FSCK utility verifies the metadata of a file system, recovers inconsistent metadata to a consistent state and thus restores the integrity of the file system.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

A file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file. Snapshot copies are in widespread use for on-line data backup. If a file becomes corrupted, the file is restored with its most recent snapshot copy that has not been corrupted.

A file system based snapshot copy facility is described in Bixby et al. U.S. Patent Application Publication 2005/

0065986 published Mar. 24, 2005, incorporated herein by reference. When a snapshot copy of a file is initially created, it includes only a copy of the file. Therefore the snapshot copy initially shares all of the data blocks as well as any indirect blocks of the file. When the file is modified, new blocks are allocated and linked to the file to save the new data, and the original data blocks are retained and linked to the inode of the snapshot copy. The result is that disk space is saved by only saving the difference between two consecutive versions of the file. The sharing of file system data blocks conserves data storage for storing files in a data storage system. The snapshot copy facility is a space saving technology that enables sharing of file system data blocks among versions of a file.

SUMMARY OF THE INVENTION

A method is used in recovering duplicate blocks in file systems. A duplicate file system block is detected in a file system. The duplicate file system block is referred by a first inode associated with a first file of the file system and a second inode associated with a second file of the file system. Metadata of the duplicate file system block is evaluated. Based on the evaluation, a set of inodes in the file system is determined. Each inode of the set of inodes refer to the duplicate file system block. Based on the determination, the set of inodes is updated.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
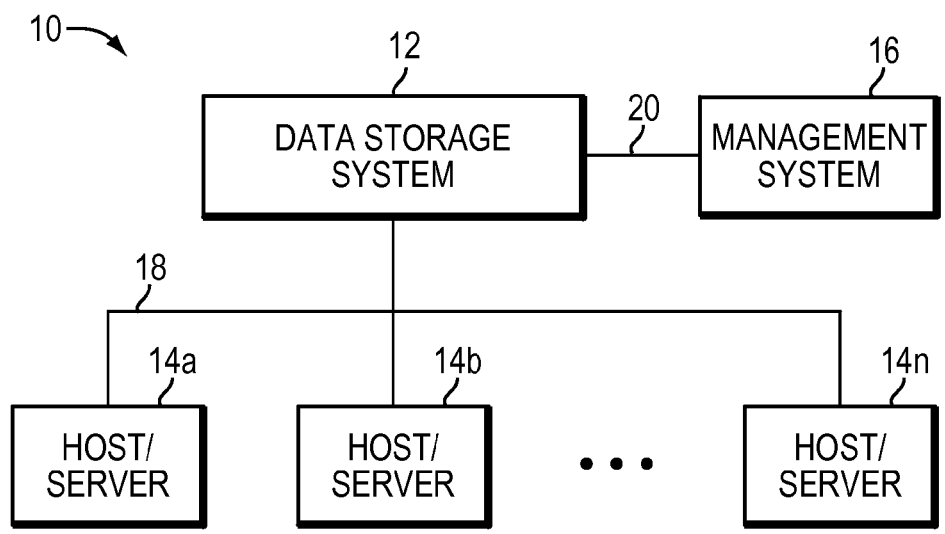
FIGS. 1-3 are examples of an embodiment of a computer system that may utilize the techniques described herein.

Described below is a technique for use in recovering duplicate blocks in file systems, which technique may be used to provide, among other things, detecting a duplicate file system block in a file system, where the duplicate file system block is referred by a first inode associated with a first file of the file system and a second inode associated with a second file of the file system, evaluating metadata of the duplicate file system block, based on the evaluation, determining a set of inodes in the file system, wherein each inode of the set of inodes refer to the duplicate file system block, and based on the determination, updating the set of inodes.

A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

Further, a mapping pointer of a file system block includes metadata information for the file system block such as a weight that indicates a delegated reference count for the mapping pointer. The delegated reference count is used by the snapshot copy facility when a replica of a file is created. Mapping pointers of the inode of the file are copied and included in the inode of the replica of the file. Mapping pointers of the inode may include mapping pointers pointing to direct data blocks and mapping pointers pointing to indirect data blocks. The delegated reference count values stored in the mapping pointers of the file and the replica of the file are updated to indicate that the file and the replica of the file share data blocks of the file.

The delegated reference counting mechanism is described in U.S. Pat. No. 8,032,498 for "Delegated reference count base file versioning" issued Oct. 4, 2011, which is incorporated herein by reference.

A file-system based snapshot copy facility needs a way of maintaining block ownership information for indicating whether or not each indirect block or data block of a file or a snapshot copy ("replica" or "version") of the file is shared with another version of the file. This block ownership information is accessed each time that the snapshot copy facility writes new data to a file, and each time that the snapshot copy facility deletes a snapshot copy. Further, as introduced above, files in a data storage system are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship.

File System Checking (FSCK) is a process by which a data storage system verifies integrity of a file system and optionally repairs any inconsistencies found during verification of the file system. In at least some systems, a FSCK utility verifies the metadata of a file system, recovers inconsistent metadata to a consistent state and thus restores the integrity of the file system. To verify the metadata of a file system, the FSCK utility traverses the metadata of the file system and gathers information, such as status and bitmaps for the traversed metadata. The FSCK utility stores the gathered information in a memory of the data storage system. The FSCK utility then validates the correctness of the metadata using the information stored in the memory. Additionally, the FSCK utility uses the stored information to restore the integrity of the file system by fixing inconsistencies found during validation of metadata.

When a file system data block is shared between a file and a replica of the file, the file system data block has the same logical offset whether the data block is accessed from the file or the replica of the file. Thus, a file system data block is shared between a file and snapshot copies of the file in such a way that the logical offset at which the file system data block is located within the file is same as the logical offset at which the data block is located within each of the snapshot copies of the file. Further, each file system data block is associated with a per block metadata (also referred to herein as "BMD") such that BMD for a file system data block includes information of the file system data block. The information included in the BMD of a file system data block of a file may include the logical offset at which the data block is allocated within the file.

Generally, a FSCK utility detects a duplicate file system block corruption scenario in which a file system block is referred to either by the same inode two or more times at different logical offsets or by two or more inodes if no snapshot copies exists for the inodes in a data storage system. Further, a FSCK utility detects a duplicate file system block corruption scenario in which a file system block is allocated at least two times at different logical offsets and referred to either by the same inode or at least two different inodes when snapshot copies of the same inode or two different inodes exists in a data storage system. Upon detecting a duplicate file system block in a file system, a FSCK utility attempts to recover the file system to a consistent state by removing references to the duplicate file system block.

Conventionally, a FSCK utility attempts to remove references to a duplicate file system block in a file system by iterating over a file system block hierarchy of each inode of the file system. In such a conventional system, a FSCK utility iterates over each allocated inode of a file system in order to find a reference to a duplicate file system block and removes the reference to the duplicate file system block from an inode. Thus, in such a conventional system, if a file system includes a large number of files, iterating over a file system block hierarchy of each file in order to find a reference to a duplicate file system block consumes more storage resources and memory of a data storage system Further, in such a conventional system, iterating repetitively over a large portion of a file system block hierarchy that has been shared between a file and snapshot copies of the file for finding a references to a duplicate file system block increases the amount of time it takes for a FSCK utility to recover a file system to a consistent state. Consequently, in such a conventional system, a process of finding a duplicate file system block may result into processing of a file system block tree hierarchy of every inode of a file system thereby significantly increasing the amount of time it may take a FSCK utility to fix a duplicate file system block corruption scenario.

By contrast, in at least some implementations in accordance with the technique as described herein, upon finding a duplicate file system block in a file system, a FSCK utility using the current technique as described herein obtains the logical offset of the duplicate file system block from the per block metadata of the duplicate file system block and instead of iterating over entire file system block tree hierarchy of each inode of a file system, processes each inode of the file system by evaluating a data block of each inode which is allocated at the logical offset obtained from the per block metadata thereby preventing the FSCK utility from iterating over entire logical space of each allocated inode of the file system.

In at least some implementations in accordance with the technique as described herein, the use of the recovering duplicate blocks in file systems technique can provide one or more of the following advantages: improving memory and storage utilization by efficiently processing metadata of each inode of a file system by using a logical offset information stored in a per block metadata of a duplicate block, improving performance of a FSCK utility by efficiently validating a file system block hierarchy of a file, and reducing the amount of time required to recover a file system from a duplicate file system block corruption scenario by efficiently finding references to a duplicate file system block and updating inodes of a file system by removing references to the duplicate file system block.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG. 2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also be included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
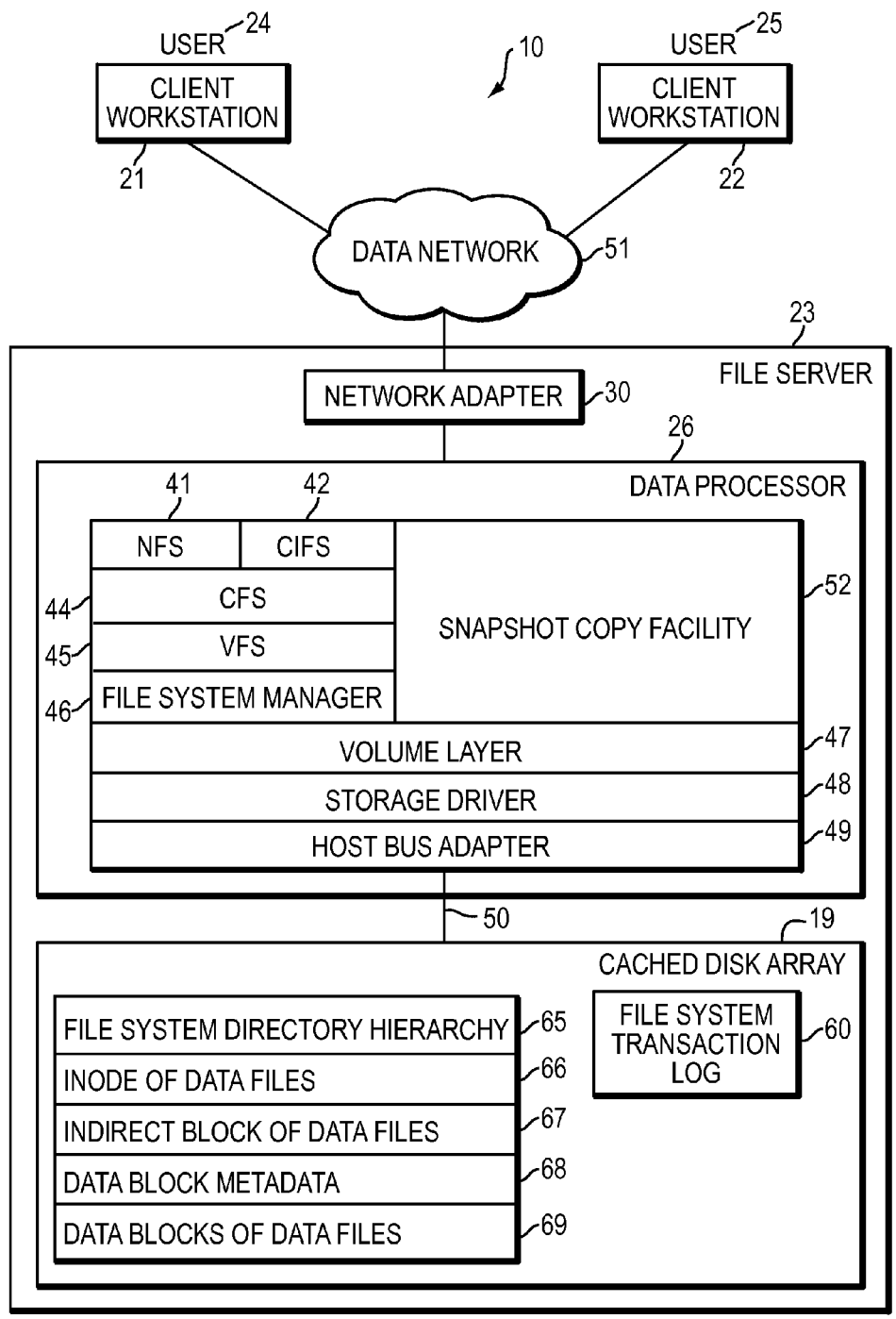

Referring now to FIG. 2, shown is an example of an embodiment of a file based data storage system that may be used in connection with performing the technique or techniques described herein. The file based data storage system 10 includes a data network 51 interconnecting clients 21, 22 and a data storage system such as a network file server 23 (also referred to simply as "file server"). The data network 51 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 2, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The data network 51 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 51 by any one of a variety of connections as may be provided and supported in accordance with the type of data network 51.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 2 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 2, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 7 and 8. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60.

Figure 3:
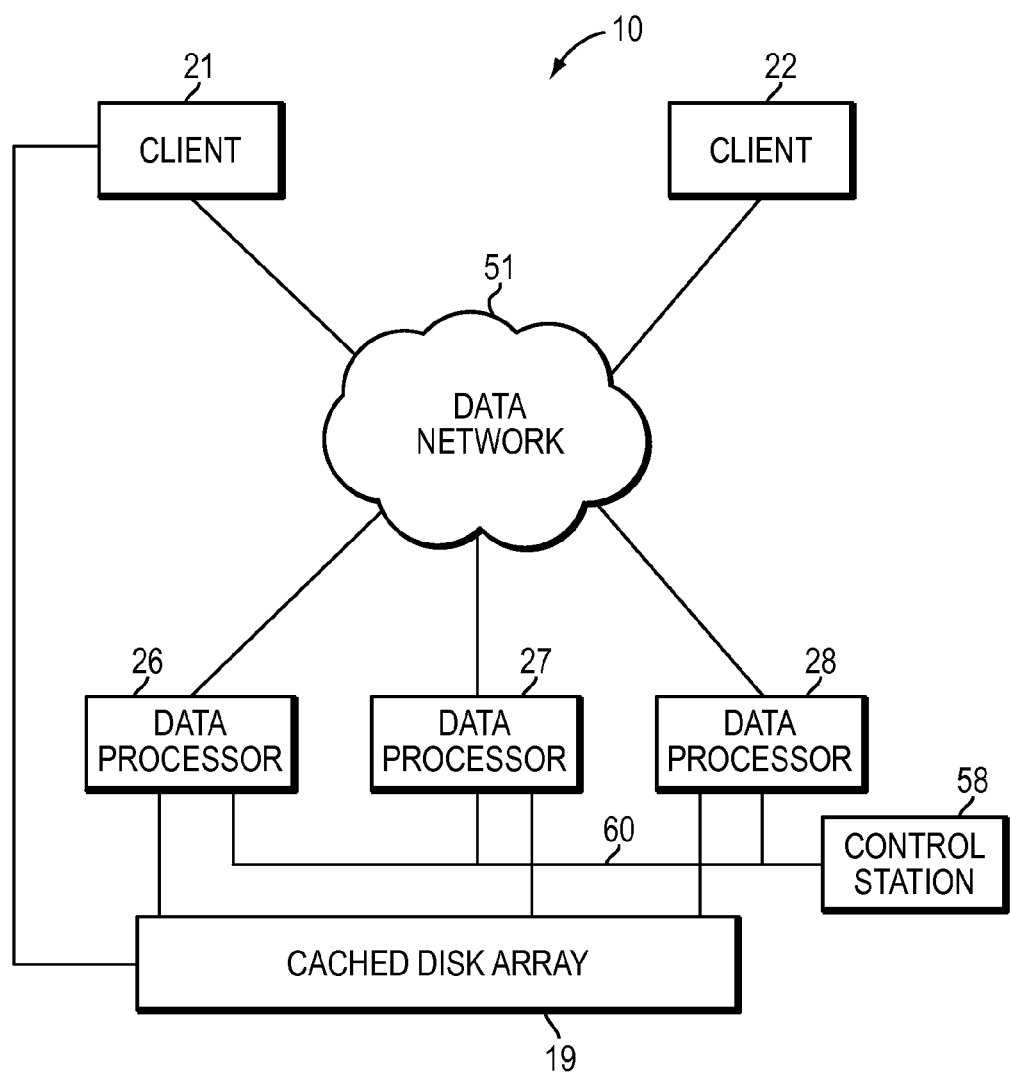

Referring now to FIG. 3, shown is the network file server 23 of FIG. 2 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 4:
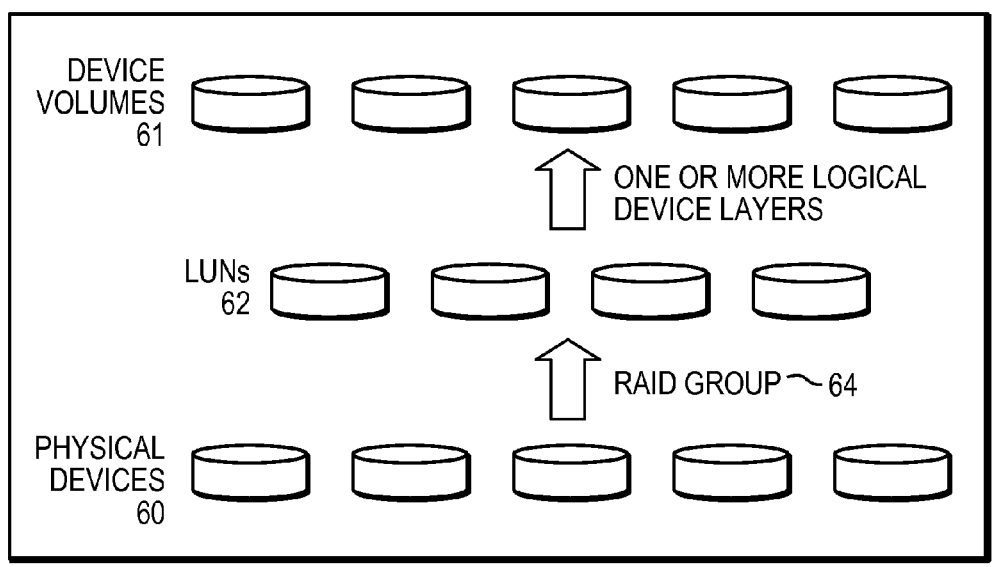
FIGS. 4-11 are diagrams illustrating in more detail components that may be used in connection with techniques herein.

FIG. 4 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

The data storage system 12 may also include one or more mapped devices. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space. Further, a mapped logical unit (also referred to herein as "mapped LUN") may be mapped to a file system.

Figure 5:
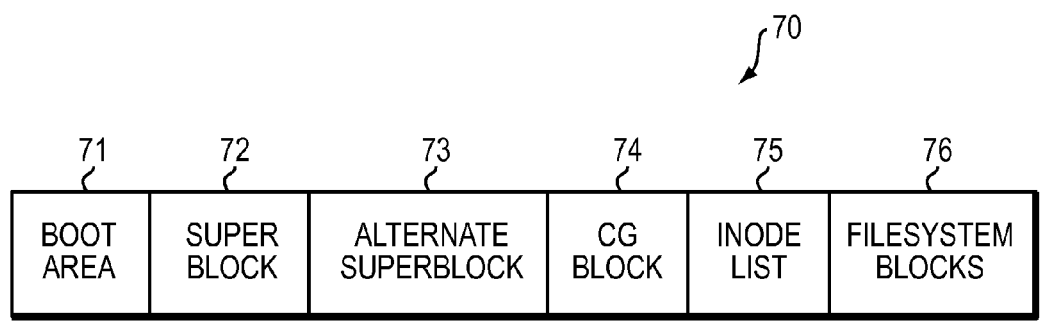

Referring to FIG. 5, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

Figure 6:
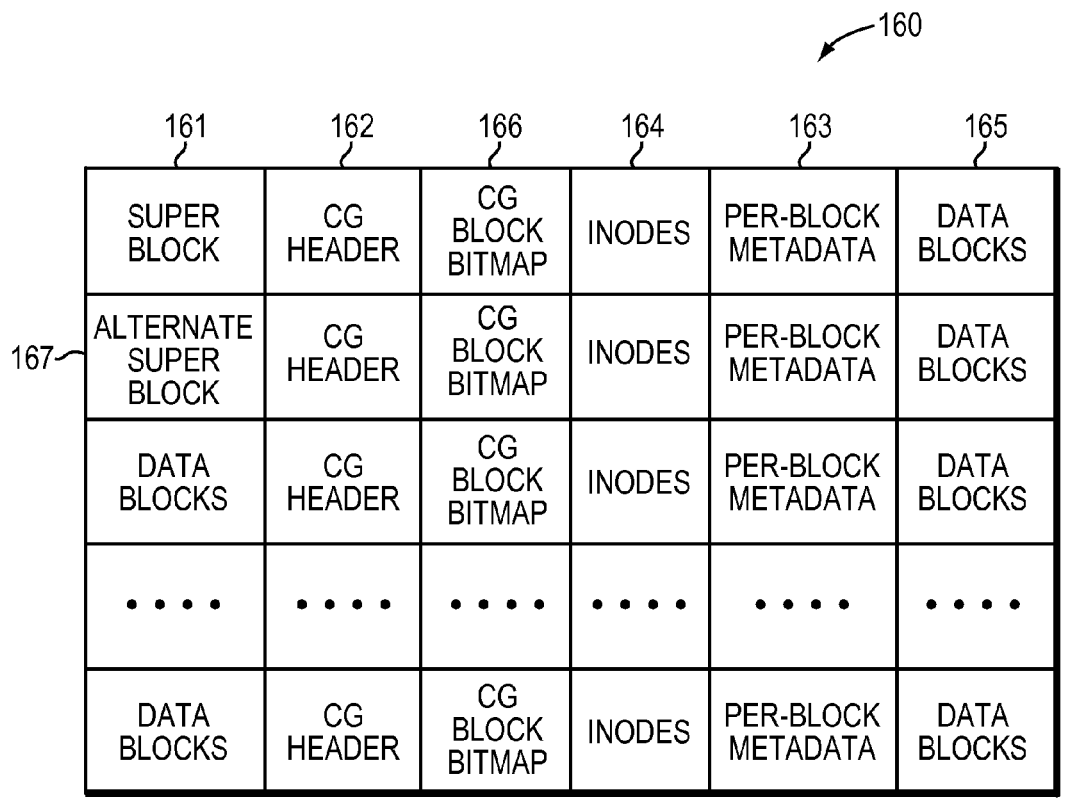

Referring to FIG. 6, shown is a memory map of a logical extent of a file system that may be included in an embodiment using the techniques herein. A logical extent of the file system is subdivided into self-contained cylinder groups. Each cylinder group is of fixed size, such that the size of the cylinder group is the granularity of storage provisioning for the file system. For example, if the file system block size is 8 kilobytes (KB), size of the file system is 4 gigabyte (GB) and size of the cylinder group is 64 megabytes (MB), the file system may include sixty four cylinder group entries, and each cylinder group entry may include 8192 file system blocks. A part of each cylinder group contains metadata of the file system. Other part of each cylinder group contains user's data that is stored in one or more data blocks. Further, each cylinder group includes metadata information that includes a redundant copy of the super-block of a file system, inodes of files of the file system, a bit map describing available blocks in the cylinder group, and information describing the usage of data blocks within the cylinder group. With reference to FIG. 6, each cylinder group (CG) of the file system 160 is a respective row in this memory map. A first cylinder group of the file system 160 indicated by first row of the memory map contains a superblock 161 of the file system, a cylinder group header 162, file system blocks for per-block metadata (BMD) 163 for storing metadata of file system blocks in the cylinder group, inodes 164 of files of file system 160, file system data blocks 165 for the cylinder group, and a cylinder group block bitmap 166 indicating whether or not each file system block in the cylinder group is allocated or not. A second cylinder group of the file system 160 indicated by second row of the memory map has the same format as the first cylinder group. The alternate superblock 167 of the second cylinder group is a copy of the superblock 161 of the first cylinder group. Other cylinder groups have the same format except they do not have a superblock. A file system block can be in one of three states: allocated, free, or reserved. A reserved file system block cannot be allocated or freed. The allocated/free state of a file system block is tracked in the cylinder group block bitmap. Each cylinder group maintains a per-block metadata (BMD) for all file system blocks that it owns. The file system 160 populates the per-block block metadata as and when a file system block is allocated—either for an indirect block or any other metadata block. The per-block metadata 163 is not directly accessible to a network client, and instead it is implicitly accessed in the process of a file system operation that makes use of the cylinder group or file system block contents. For example, the process of allocating or freeing a block of the cylinder group validates and updates block metadata owner state. It should be noted that the memory map of a cylinder group may include other fields (not shown in the FIG. 6) that may be included in a file system stored in data storage system 10.

Figure 7:
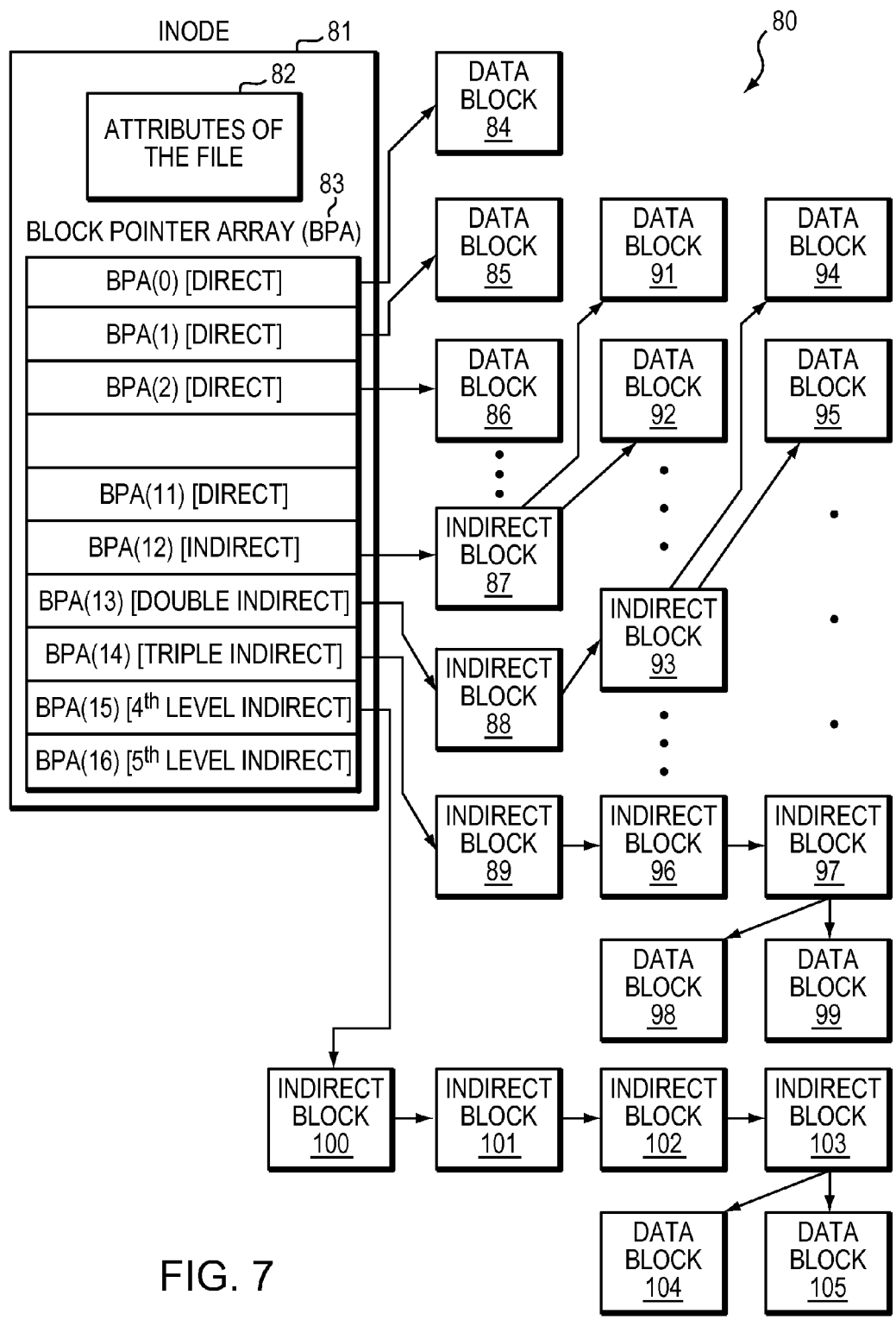

Referring to FIG. 7, shown is a representation of an inode of a file and a file system block tree hierarchy of the inode that may be included in an embodiment using the techniques described herein. A file includes an inode 81 containing attributes 82 (such as atime and mtime) of the file, and a block pointer array 83. The block pointer array 83 has seventeen block pointer array entries BPA(0) to BPA(14). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 96 that points to an indirect block 97 that points to one or more additional data blocks (e.g., 98, 99). Similarly the file may include fourth (BPA(15)) and fifth (BPA(16)) level of indirections indicated by indirect blocks 100-103 and data blocks 104-105.

Figure 8:
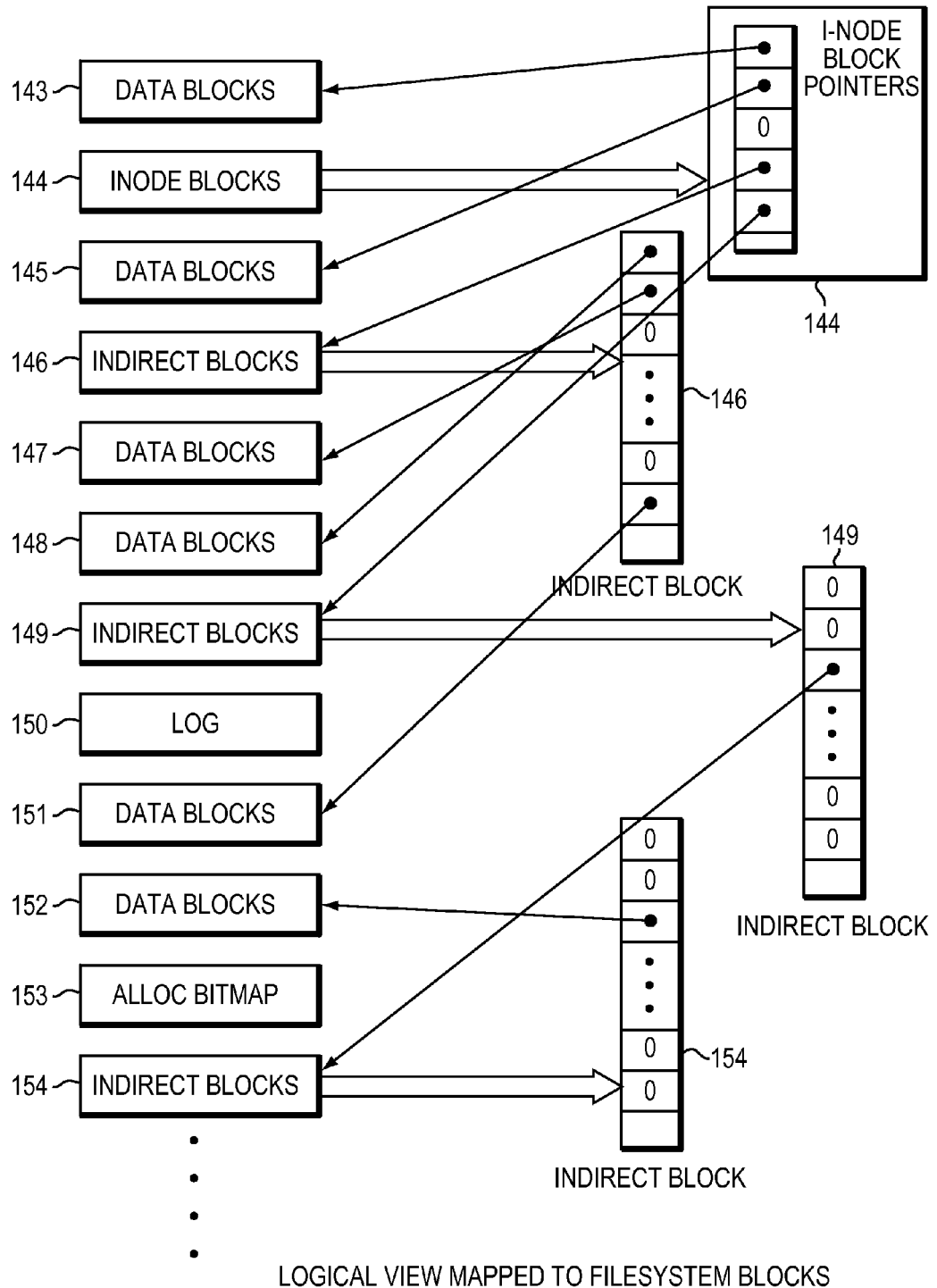

Referring to FIG. 8, shown is a logical and a corresponding physical representation of a file system depicting a standard hierarchical UNIX-based file system using an indirect mapping protocol that may be included in an embodiment using the techniques herein. A file system includes one or more file system blocks. Some of the file system blocks are data blocks 143, 145, 147, 148, 151 and 152, some file system blocks may be indirect block 146, 149 and 154 as described below, or some file system blocks are free blocks that have not yet been allocated to any file in the file system. The first of up to twelve entries of block pointers in the inode 144 directly point to the first of up to twelve data blocks 143, 145, etc. of the file. If the file contains more than twelve data blocks, then the thirteenth entry of the block pointer array 144 contains an indirect block pointer pointing to an indirect block 146 containing pointers to one or more additional data blocks 147, 148, 151, etc. If the file contains so many data blocks that the indirect block 146 becomes full of block pointers, then the fourteenth entry of the block pointer array 144 contains a double indirect block pointer to an indirect block 146 that itself points to an indirect block 149 that points to one or more additional data blocks 152, etc. If the file is so large that the indirect block 149 becomes full of block pointers and its descendant indirect blocks are also full of block pointers, then the fifteenth entry of the block pointer array 144 includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Log 150 provides transactional semantics to a file system and minimizes number of metadata I/Os by logging updates to metadata of the filesystem in the log 150. Allocation bitmap 153 tracks which file system blocks are free in a file system. An entry indicating a value zero in an indirect block represents unallocated regions of a File or a LUN.

Figure 9:
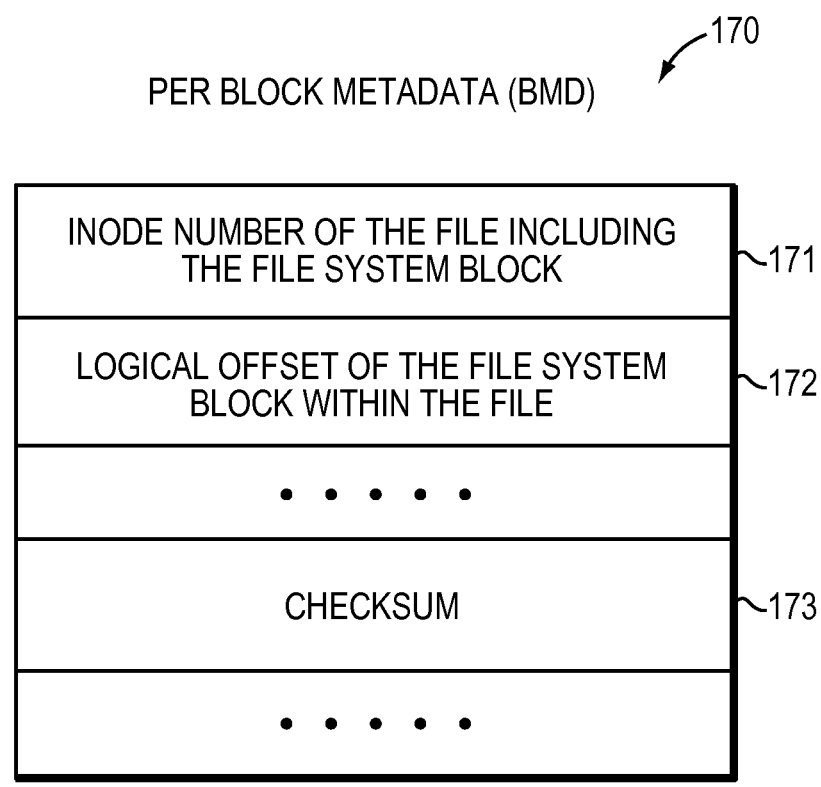

Referring to FIG. 9, shown is a representation of a per block metadata (also referred to as "BMD") for a file system block that may be included in an embodiment using the techniques described herein. The per-block metadata 170 for a file system block includes an inode number 171 of a file of the file system, the file system block number and the logical offset of the file system block 172. The per-block metadata 170 for a file system block also includes an internal checksum 173 protecting the integrity of the information stored in the per-block metadata 170. The per-block metadata for a file system block may further include the state of the per-block metadata.

Figure 10:
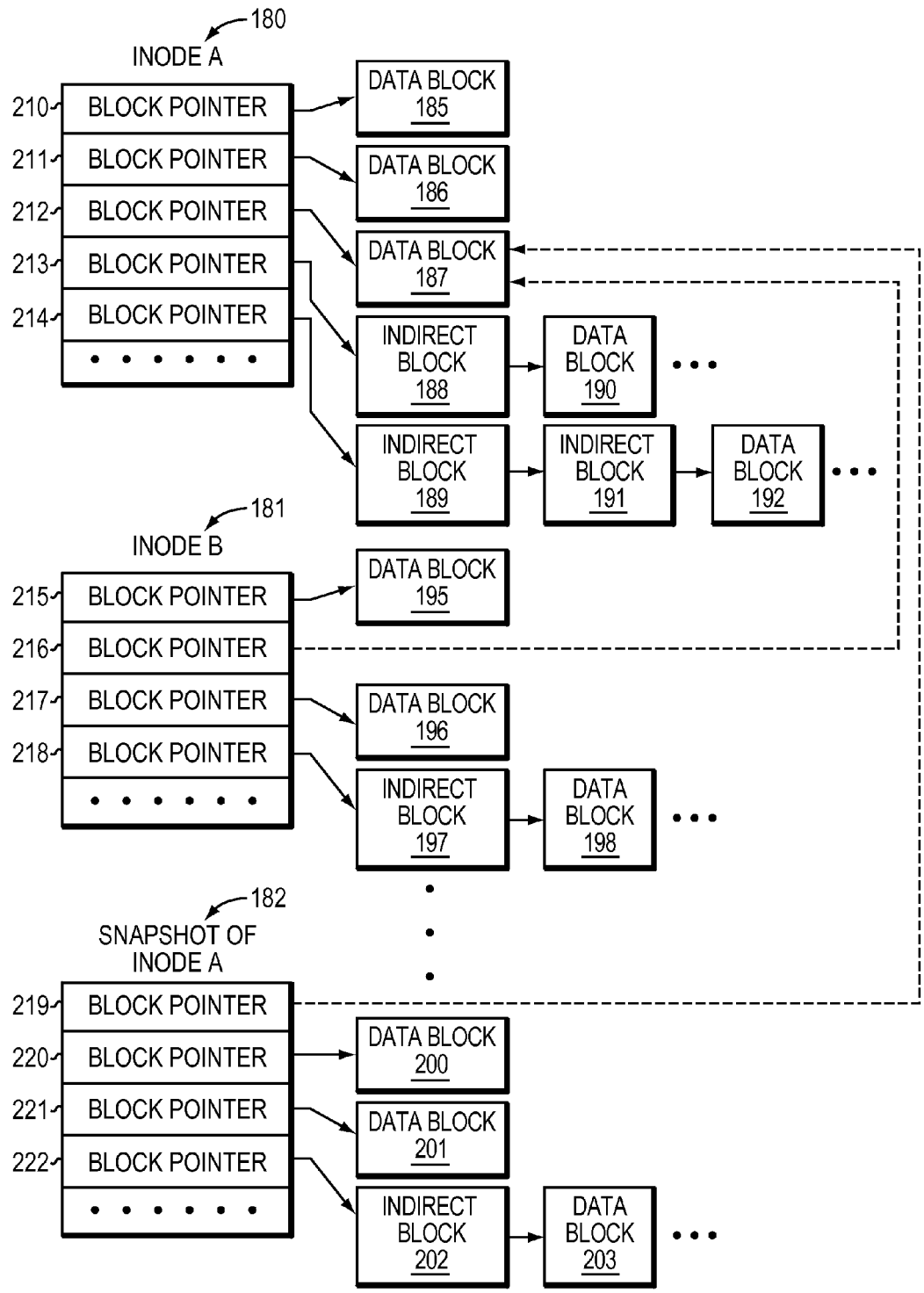

Referring to FIG. 10, shown is an illustration of an example of a duplicate file system block corruption scenario. In FIG. 10, for example, inode A 180 is associated with file "A" of a file system, inode B 181 is associated with a file "B" of the file system, and snapshot inode A 182 is associated with a snapshot copy of the inode A 180. Inode A 180 includes block pointers 210-214 such that indirect blocks 188, 189, 191 and data blocks 185-187, 190, 192 represent a file system block tree hierarchy for file "A". Similarly, inode A 181 includes block pointers 215-218 such that indirect blocks 197 and data blocks 195, 196, 198 represent a file system block tree hierarchy for file "B". Similarly, snapshot inode A 182 includes block pointers 219-222 such that indirect blocks 202 and data blocks 200, 201, 203 represent a file system block tree hierarchy for the snapshot copy of the file "A". In such an example, file system data block 187 is determined as a duplicate file system data block. As illustrated in FIG. 10, data block 187 is allocated at a logical offset indicated by block pointer 212. Further, when iterating over the file system block tree hierarchy of inode B 181, a FSCK utility determines that block pointer 216 of inode B 181 also refers to data block 187 thereby finding a duplicate file system block corruption scenario in which data block 187 is allocated at two different logical offsets by two inodes of the file system. Further, the FSCK utility determines that block pointer 219 of snapshot inode A 182 also refers to the duplicate data block 187 at the logical offset that is different from the logical offset at which data block 187 is allocated to inode A. Thus, in such a scenario, upon detecting the duplicate data block 187, the FSCK utility updates inodes 180-182 in order to remove references to the duplicate data block 187 from block pointers 220, 216, 212.

Further, in such an example as illustrated in FIG. 10, a conventional FSCK using a conventional technique iterates over entire file system block tree hierarchy of each of the inodes 180-182 in order to find a block pointer within each inode which refers to a duplicate data block. By contrast, in at least one embodiment of the current technique, a FSCK utility using the current technique as described below herein determines the logical offset of the duplicate data block 187 from the per block metadata of the duplicate data block upon determining that data block 187 has either been referred by more than one inode or been located at two or more different logical offsets. Upon determining the logical offset of the data block 187 from the per block metadata, the FSCK utility evaluates a logical extent of inodes of the file system based on the logical offset determined from the per block metadata.

In at least one embodiment of the current technique, a shared bit in the per block metadata of a file system block indicates whether the file system block is shared by a file and snapshot copies of the file. If a file system does not support a capability for creating snapshot copies of a file of a file system, the shared bit is not set and is disabled for use for each block pointer of each inode of the file system. However, if a file system does support a capability for creating snapshot copies of a file of the file system and if a file system block of a file of the file system is shared between two or more version inodes, the shared bit for the file system block is set. Further, if a delegated weight in a block pointer for a file system block is less than a weighted reference count stored in the per block metadata of the file system block, the file system block is shared between two or more version inodes. Further, when a FSCK utility finds a second reference to a file system block that has been validated previously as a single reference, the FSCK utility sets the shared bit for the file system block in a shared block bitmap and sets the shared bit in the single reference that has been found previously.

In at least one embodiment of the current technique, metadata structures used by a FSCK facility for removing a duplicate file system block includes a used block bitmap, a shared block bitmap, a duplicate block bitmap and a validated reference count bitmap. A bit for a data block in the used block bitmap is set to indicate that the data block is a part of an inode and the data block has been validated successfully. A bit for a data block in the shared block bitmap is set to indicate that the FSCK utility has found a second reference to the data block that has been validated previously as a single reference. A bit for a data block in the duplicate block bitmap is set to indicate that either the data block is located at more than one location at different logical offsets in version files or the data block is located at more than one location in files that do not support creating snapshot copies. Further, a bit for a data block in the validated reference count bitmap is set to indicate that reference counts for the data block has been validated successfully and the total references for the data block matches with the reference count value stored in the per block metadata of the data block. Thus, the validated reference count bitmap keeps track of each data block that has a missing reference.

Thus, in at least one embodiment of the current technique, for version file inodes (also referred to herein as "snapshot inodes"), a duplicate file system block is a file system block that has been allocated at least two times at different logical offsets within the version file inodes. Further, for inodes such as a regular file inode, a directory inode that do not support creating snapshot copies, a duplicate file system block is a file system block that is referred two or more times in file system block hierarchies of inodes. A first phase of a FSCK utility detects a duplicate file system block when iterating over file system block tree hierarchies of inodes of a file system for validating metadata of the inodes. A second phase of the FSCK utility removes references to a duplicate file system block by using metadata information gathered during the first phase of the FSCK utility. The second phase evaluates a file system block associated with each bit of the duplicate block bitmap and determines the logical offset of the file system block from the per block metadata of the file system block. The FSCK utility then evaluates the logical offset within each inode of the file system to find a reference to the file system block. Further, if a duplicate block is an indirect block, a weighted reference count of each block of a block tree hierarchy represented by the indirect block is updated and the duplicate block is removed from the inode. Thus, a duplicate file system block may be a data block or an indirect block.

Thus, in at least one embodiment of the current technique, when validating file system blocks of a file system, a FSCK utility stores information regarding duplicate data blocks found when validating the file system blocks of the file system in metadata structures such as bitmaps. A FSCK utility validates file system blocks of a file system by evaluating metadata information stored in a per block metadata associated with each file system block. If the logical offset at which a file system block is located within file is not same as the logical block offset stored in the per block metadata of the file system block, the file system block is considered as an inconsistent file system block such as a duplicate file system block. Further, due to the mismatch of logical offset information, the FSCK utility removes a reference of a duplicate data block from an inode and indirect block that refers to the duplicate data block. Further, a bit for a duplicate data block is set in a duplicate block bitmap in order to detect subsequent references to the duplicate data block and to remove the subsequent references from inodes of a file system. Further, the FSCK utility uses a duplicate block bitmap for removing each reference to a duplicate data block found when iterating over inodes of a file system during later phases of the FSCK utility.

Figure 11:
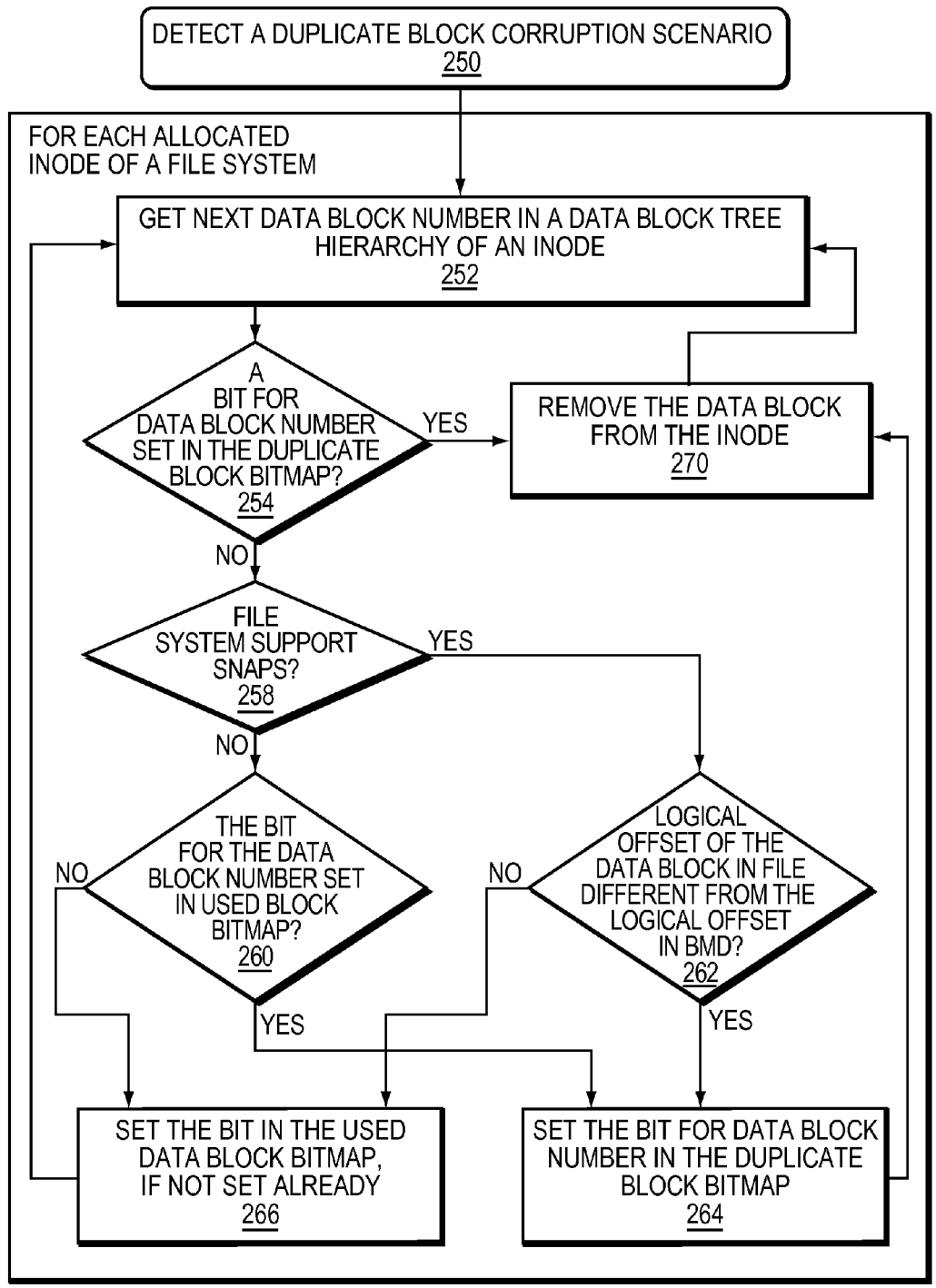

Referring to FIG. 11, shown is a more detailed flow diagram illustrating recovering duplicate blocks in file systems. In at least one embodiment of the current technique, a FSCK utility first finds a duplicate file system block corruption scenario when traversing a file system block tree hierarchy of an inode of a file of a file system. Further, the FSCK utility creates and updates metadata structures such as bitmaps that are used by the FSCK utility for recovering inconsistent metadata found during traversal of inodes of the file system. Further, the FSCK utility uses the metadata structures such as bitmaps for removing duplicate file system blocks found during traversal of the inodes of the file system.

With reference also to FIGS. 1-10, in at least one embodiment of the current technique, a FSCK utility traverses inodes of a file system in order to detect a duplicate file system block corruption scenario (step 250). For each inode of the file system, the FSCK utility traverses a file system block hierarchy of the inode by evaluating each data block of the file system block hierarchy of the inode (step 252). For each data block, the FSCK utility determines whether a bit for a data block is set in a metadata structure such as a duplicate block bitmap (step 254). Upon determining that the bit for the data block is set in the duplicate block bitmap indicating a duplicate block corruption scenario, the reference to the data block is removed from the inode during the next phase by the FSCK utility (step 270) and the FSCK utility proceeds to evaluate a next data block of the file system block hierarchy of the inode (step 252). However, if the bit for the data block is not set in the duplicate block bitmap, a determination is made as to whether the file system includes a capability for creating snapshot copies of files of the file system (step 258). Upon determining that the file system includes the capability for creating snapshot copies of files of the file system and snapshot copies of the inode may exists, a determination is made as to whether a logical offset at which the data block is allocated in the inode of the file is different from a logical offset of the data block stored in the per block metadata associated with the data block (step 262). Upon determining that the logical offset at which the data block is allocated in the inode of the file is different from the logical offset of the data block stored in the per block metadata associated with the data block indicating a duplicate block corruption scenario, the bit for the data block is set by updating the duplicate block bitmap (step 264), the reference to the data block is removed from the inode during the next phase by the FSCK utility (step 270), and the FSCK utility proceeds to evaluate a next data block of the file system block hierarchy of the inode (step 252). However, if the logical offset at which the data block is allocated in the inode of the file is same as the logical offset of the data block stored in the per block metadata associated with the data block indicating that the data block is shared at the same logical offset between the inode of the file and snapshot inodes of snapshot copies of the file, the bit for the data block is set by updating a metadata structure such as a used data block bitmap, if the bit is not set already in the used data block bitmap (step 266), and the FSCK utility proceeds to evaluate a next data block of the file system block hierarchy of the inode (step 252).

Further, if the file system does not include the capability for creating snapshot copies of files of the file system and snapshot copies of the inode may not exist, a determination is made as to whether the bit for the data block is set in the used data block bitmap (step 260). Upon determining that the bit for the data block is set in the used data block bitmap indicating a duplicate block corruption scenario, the bit for the data block is set by updating the duplicate block bitmap (step 264), the reference to the data block is removed from the inode during the next phase by the FSCK utility (step 270), and the FSCK utility proceeds to evaluate a next data block of the file system block hierarchy of the inode (step 252). However, if the bit for the data block is not set in the used data block bitmap, the bit for the data block is set by updating the used data block bitmap (step 266), and the FSCK utility proceeds to evaluate a next data block of the file system block hierarchy of the inode (step 252).

Figure 12:
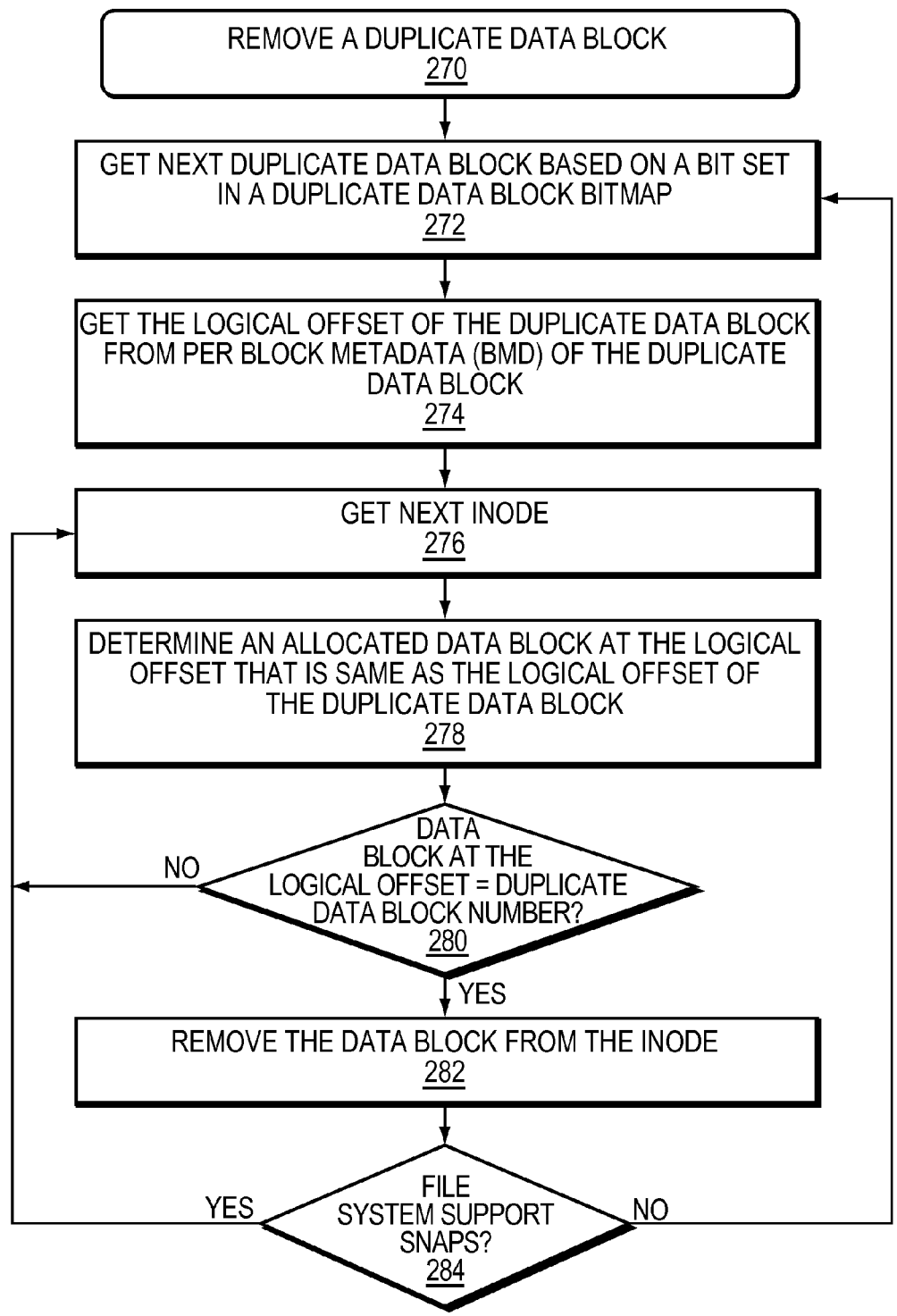
FIG. 12 is a flow diagram illustrating processes that may be used in connection with techniques herein.

Referring to FIG. 12, shown is a more detailed flow diagram illustrating recovering duplicate blocks in file systems. In at least one embodiment of the current technique, if a FSCK utility finds a duplicate block corruption scenario when iterating over file system block tree hierarchies of inodes of a file system, the FSCK utility uses metadata structures such as bitmaps to remove duplicate data blocks found during traversal of the inodes of the file system. With reference also to FIGS. 1-10, in at least one embodiment of the current technique, a FSCK utility removes a duplicate data block found in a file system in order to recover the file system from the duplicate block corruption scenario (step 270). In at least one embodiment of the current technique, the FSCK utility evaluates each data block for which a bit has been set in a metadata structure such as a duplicate block bitmap indicating a duplicate data block (step 272). For each data block for which a bit has been set in the duplicate block bitmap, the FSCK utility obtains the logical offset of the duplicate data block from the per block metadata of the duplicate data block (step 274). The FSCK utility then uses the logical offset determined form the per block metadata for evaluating each inode of the file system by evaluating only those data blocks that are allocated at that logical offset within each inode instead of iterating entire file system block tree hierarchy of each node (step 276). For each inode of the file system, the FSCK utility determines a data block that is allocated at the logical offset within the inode such that the logical offset is same as the logical offset of the duplicate data block (step 278). A determination is made as to whether the file system data block number of the data block found at the logical offset within the inode is same as the file system data block number of the duplicate data block (step 280). Upon determining that the data block number of the data block found at the logical offset within the inode is same as the file system data block number of the duplicate data block indicating a duplicate reference to the data block, the reference to the duplicate data block is removed from the inode (step 282). However, if the data block number of the data block found at the logical offset within the inode is not same as the file system data block number of the duplicate data block, the FSCK utility proceeds to get the next inode in the file system for determining a duplicate data block in a file system block hierarchy represented by the next inode (step 276).

Further, after a duplicate data block is removed from the inode of the file system, a determination is made as to whether the file system supports a capability for creating snapshot copies of a file of the file system (step 284). Upon determining that the file system supports the capability for creating snapshot copies of a file of the file system indicating that snapshot copies of the inode may exists, the FSCK utility evaluates a next inode of the file system (step 276). However if the file system does not support the capability for creating snapshot copies of a file of the file system indicating that snapshot copies of the inode may not exists, the FSCK utility evaluates a next duplicate data block based on a bit set in the duplicate block bitmap in order to find the next occurrence of a duplicate data block corruption scenario within the file system (step 272).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for use in recovering duplicate blocks in file systems, the method comprising:
   detecting an invalid duplicate block scenario by comparing a logical offset of a file system block with a logical offset of the file system block included in metadata of the file system block, wherein the invalid duplicate block scenario indicates at least two references to the file system block in a file system by at least two inodes of the file systems, wherein the at least two inodes includes first and second inodes, wherein the file system block is referred to by the first inode associated with a first file of the file system at a first logical offset within the first file and the second inode associated with a second file of the file system at a second logical offset within the second file, wherein the first and second logical offsets are different if the first file is a snapshot copy of the second file;

based on the detecting the invalid duplicate block scenario, updating metadata of the file system block, wherein the updating the metadata of the file system block indicates that the file system block is an invalid duplicate block;

determining a set of inodes in the file system, wherein each inode of the set of inodes refer to the file system block;

processing said each inode of the set of inodes by evaluating file system blocks of each inode residing at a logical offset same as the logical offset of the file system block; and based on the processing, updating the set of inodes, wherein the updating the set of inodes includes removing each reference to the file system block from said each inode of the set of inodes.

2. The method of claim 1, wherein a file of the file system is associated with an inode, wherein the file includes a set of file system blocks organized in a file system block hierarchy, wherein a file system block includes a data block and an indirect block.

3. The method of claim 1, wherein a file system block of a file is associated with a per block metadata, wherein the per block metadata includes a logical offset of the file system block.

4. The method of claim 1, wherein detecting the file system block further comprising:

evaluating each file system block of each inode of the file system by using information stored in a duplicate block bitmap;

determining whether the file system includes replica of a file;

comparing a logical offset of each file system block with a logical offset stored in per block metadata associated with the file system block; and based on the comparison, updating the information stored in the duplication block bitmap.

5. The method of claim 4, further comprising:
evaluating information stored in a used block bitmap for each file system block of each inode of the file system.

6. The method of claim 1, wherein determining the set of inodes of the file system further comprising:

determining a logical offset of the file system block of the file system;

iterating each inode of the file system by evaluating a file system block allocated at the logical offset within each inode of the file system;

determining whether the file system block at the logical offset within an inode is same as the file system block; and based on the determination, removing the file system block from the inode.

7. A system for use in recovering duplicate blocks in file systems, the system comprising a processor configured to:

detect an invalid duplicate block scenario by comparing a logical offset of a file system block with a logical offset of the file system block included in metadata of the file system block, wherein the invalid duplicate block scenario indicates at least two references to a file system block in a file system by at least two inodes of the file systems, wherein the at least two inodes includes first and second inodes, wherein the file system block is referred to by the first inode associated with a first file of the file system at a first logical offset within the first file and the second inode associated with a second file of the file system at a second logical offset within the second file, wherein the first and second logical offsets are different if the first file is a snapshot copy of the second file;

based on the detecting the invalid duplicate block scenario, update metadata of the file system block, wherein the updating the metadata of the file system block indicates that the file system block is an invalid duplicate block;

determine a set of inodes in the file system, wherein each inode of the set of inodes refer to the file system block;

process said each inode of the set of inodes by evaluating file system blocks of each inode residing at a logical offset same as the logical offset of the file system block; and update, based on the processing, the set of inodes, wherein the updating the set of inodes includes removing each reference to the file system block from said each inode of the set of inodes.

8. The system of claim 7, wherein a file of the file system is associated with an inode, wherein the file includes a set of file system blocks organized in a file system block hierarchy, wherein a file system block includes a data block and an indirect block.

9. The system of claim 7, wherein a file system block of a file is associated with a per block metadata, wherein the per block metadata includes a logical offset of the file system block.

10. The system of claim 7, wherein detecting the file system block further comprising:

evaluate each file system block of each inode of the file system by using information stored in a duplicate block bitmap;

determine whether the file system includes replica of a file;

compare a logical offset of each file system block with a logical offset stored in per block metadata associated with the file system block; and update, based on the comparison, the information stored in the duplication block bitmap.

11. The system of claim 10, further comprising:
evaluate information stored in a used block bitmap for each file system block of each inode of the file system.

12. The system of claim 7, wherein determining the set of inodes of the file system further comprising:

determine a logical offset of the file system block of the file system;

iterate each inode of the file system by evaluating a file system block allocated at the logical offset within each inode of the file system;

determine whether the file system block at the logical offset within an inode is same as the file system block; and remove, based on the determination, the file system block from the inode.

13. A computer-implemented method for use in recovering duplicate blocks in file systems, the method comprising:

detecting an invalid duplicate block scenario by comparing a logical offset of a file system block with a logical offset of the file system block included in metadata of the file system block, wherein the invalid duplicate block scenario indicates at least two references to the file system block in a file system by at least two inodes of the file systems, wherein the at least two inodes includes first and second inodes, wherein the file system block is referred to by the first inode associated with a first file of the file system at a first logical offset within the first file and the second inode associated with a replica of the first file of the file system at a second logical offset within the second file, wherein the first and second logical offsets are different if the first file is a snapshot copy of the second file;

based on the detecting the invalid duplicate block scenario, updating metadata of the file system block, wherein the updating the metadata of the file system block indicates that the file system block is an invalid duplicate block;

determining a set of inodes in the file system, wherein each inode of the set of inodes refer to the file system block;

processing said each inode of the set of inodes by evaluating file system blocks of each inode residing at a logical offset same as the logical offset of the file system block; and based on the processing, updating the set of inodes, wherein the updating the set of inodes includes removing each reference to the file system block from said each inode of the set of inodes.

* * * * *